July 16, 1946.  C. J. WELLER  2,404,152
ANCHORING BRACKET
Filed June 19, 1942
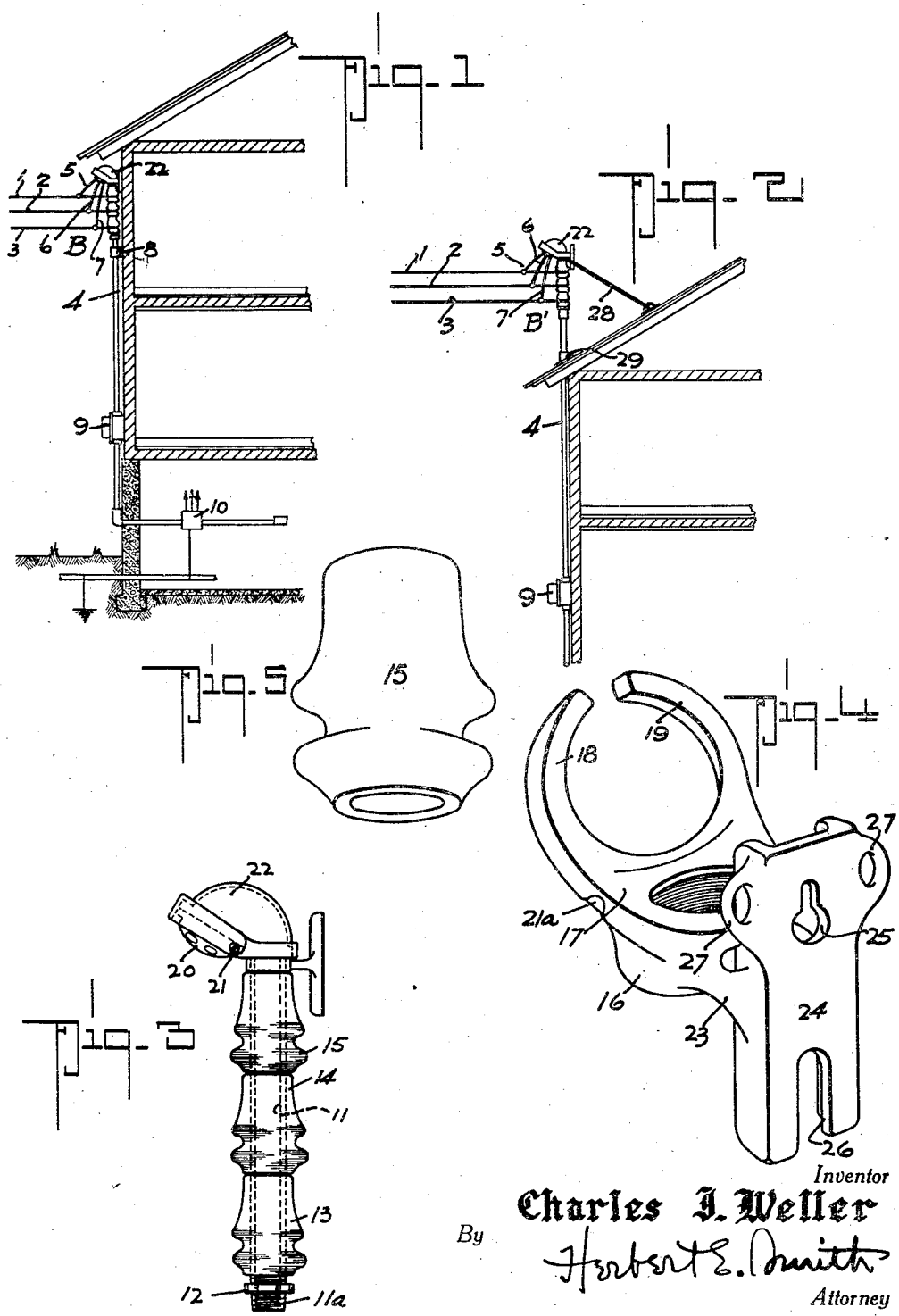
Inventor
Charles J. Weller
By Herbert E. Smith
Attorney Patented July 16, 1946

2,404,152

UNITED STATES PATENT OFFICE 2,404,152

ANCHORING BRACKET

Charles J. Weller, Coulee City, Wash.

Application June 19, 1942, Serial No. 447,713

3 Claims. (Cl. 174—81)

My present invention relates to an improved anchoring bracket and service entrance conduit for use on the exterior of a house or other building in connection with the branch electric wires leading from the main line to the house, and also the lead-in wires which enter the house from the anchoring bracket. The primary object of the invention is the provision of an anchoring bracket of this type which is comparatively inexpensive in the cost of manufacture and comprises a minimum number of parts that are readily assembled; and which bracket may with facility be attached to the supporting wall, or to the roof of the house to insure a substantial anchorage for the two sets of electric wires.

With the above objects in view the invention consists in certain novel combinations and arrangements of parts as will hereinafter be more fully set forth and claimed. In the accompanying drawing I have illustrated one complete example of the physical embodiment of my invention, and two installations thereof, wherein the parts are combined and arranged according to the best mode I have provided for the practical application of the principles of my invention, but it will be understood that these exemplifying structures may be changed or altered within the scope of my appended claims without departing from the principles of my invention.

Figure 1 is a diagrammatic view showing a sectional elevation of a portion of a house with the anchoring bracket installed under one of the eaves, and attached to the up-right wall of the house, and Figure 2 indicates the installation of the anchoring bracket on the roof of a house.

Figure 3 is an enlarged view in side elevation of the anchoring bracket and the conduit-pipe, with the wires omitted.

Figure 4 is an enlarged perspective view of the anchoring bracket per se.

Figure 5 is an enlarged detail perspective view of one of the insulated anchoring bushings for the wires.

In order that the general arrangement of parts and the utility of the bracket may readily be understood I have shown in Figures 1 and 2 the branch wires 1, 2, and 3 leading from the main wires to the bracket indicated as a whole by the letter B in Figure 1 and B' in Figure 2. The vertical conduit 4 conceals the house wires 5, 6, and 7 which extend through the conduit from the bracket and branch wires, and the usual clamp 8 is employed for attaching the conduit against the side of the house. A meter 9 is indicated for the electric current entering the house, and the fuse box 10 to which the wires 5, 6, and 7 connect, distributes the various circuit throughout the house.

The anchoring bracket as a whole includes a bracket pipe 11, threaded at 11a for connection with the vertical conduit 4, and a nut 12 on this threaded end supports the three insulating bushings or insulators 13, 14, and 15 to which the wires are connected. As best seen in Figure 4 the anchoring bracket is fashioned with a threaded sleeve 16 that screws down on the upper threaded end of the bracket pipe, and the bushings, here shown as three in number, are held between the nut 12 and the threaded sleeve of the bracket.

Threaded sleeve is fashioned with a supporting head 17 which merges into two circularly arranged prongs or supporting arms 18 and 19 that project obliquely from the head and sleeve, and a perforated, flanged, fiber disk 20 is enclosed within these arms and disposed in an oblique plane for the reception of the house wires 5, 6, and 7 that are connected to the branch wires 1, 2, and 3. The conducting wires pass upwardly through the perforations in the disk, are bent over and downwardly, and then pass down through the bracket pipe and the conduit-pipe to the meter. The perforated disk is held in position by a set screw 21, and the disk and upper end of the bracket pipe are covered by a rounded cap 22 that closes the upper end of the bracket for the protection of the wires. The set screw 21 engages a notch 21a (Fig. 4) of the bracket, and also holds the cap 22 in place, as well as securing the fiber disk 20 through which the wires pass.

At the diametrically opposite side of the threaded sleeve 16 of the bracket, an integral lateral arm 23 is fashioned, and this arm terminates in an upright, integral head 24 for use in attaching the bracket to its support. As an attaching means, the attaching head is fashioned with an upper key-hole slot 25, and an alined, lower, open slot 26, for the screws, bolts, nails, or other attaching means employed for fastening the bracket against the wall as in Figure 1. The key-hole slot and the open slot provide facile means for properly adjusting the anchoring bracket in desired position for rigid attachment to the wall of the house, and they also render more convenient the detachment of the bracket from the house wall when necessary or desirable. The attaching head, as indicated is located in a plane parallel with the bracket-pipe and the conduit or pipe 4, and when the anchoring bracket is attached as in Figure 1, it provides a substantial anchorage for the branch wires 1, 2, and 3, and a substantial support for the house wires 5, 6, and 7, and the pipe or conduit 4. The integral unit involving the attaching sleeve, the prongs, the bracket arm and the attaching head, provides convenience in assembling and leading in the house wires, and the whole anchoring bracket, involving the bracket pipe and bushings thereon may readily be assembled and installed in rigid position for use.

In Figure 2, where the anchoring bracket is fixed on the roof of the house instead of under the eave, I utilize a pair of perforated ears 27, 27 at the upper end of the head 24 and brace wires 28 extend from these ears to fastenings on the roof. The conduit 4 passes upward through a hole in the roof, and a base and supporting member 29 encircles the conduit and is attached to the roof to close the hole and hold the conduit, the bracket pipe and the bracket in upright position, which position is strengthened by the stays or brace wires 28.

Having thus fully described my invention, what I claim as new and desire to secure by Letters Patent is:

1. An entrance bracket, comprising: a rigid tubular conduit having an entrance cap on its upper end, an insulative spool surrounding said conduit and supported thereon closely adjacent below said cap, and means below and means above said spool for securing said conduit to a building structure in upright positioning.

2. An entrance bracket, comprising: a rigid tubular conduit having an entrance cap on its upper end, said entrance cap having a downwardly directed opening to receive from below an electrical conductor wire, an insulative spool surrounding said conduit and supported thereon closely adjacent said cap, said spool being adapted to be encircled by and thus have anchored thereto a conductor wire strung from a remote point and from which a lead-in conductor is upwardly passed to said opening in the entrance cap, means below said spool for securing said conduit to a building structure in an upright position, and means above said spool for bracing said conduit on its securing means whereby the weight and drag of the conductor from spool is borne by said conduit.

3. An entrance bracket, comprising: a rigid tubular conduit having an entrance cap on its upper end, an insulative spool surrounding said conduit in slideable engagement, means for maintaining said spool on said conduit closely adjacent said cap, and means below and means above said spool for securing said conduit to a building structure in upright positioning whereby a lead in conductor may be anchored to said spool and conducted to the building upwardly into said entrance cap.

CHARLES J. WELLER.